US008881156B2

(12) United States Patent
Catterall et al.

(10) Patent No.: US 8,881,156 B2
(45) Date of Patent: *Nov. 4, 2014

(54) APPORTIONING SUMMARIZED METRICS BASED ON UNSUMMARIZED METRICS IN A COMPUTING SYSTEM

(75) Inventors: Roy A. Catterall, Riverton (AU); Stephen J. Yates, Beaconsfield (AU)

(73) Assignee: International Business Machines Corporation, Armonk, NY (US)

( * ) Notice: Subject to any disclaimer, the term of this patent is extended or adjusted under 35 U.S.C. 154(b) by 288 days.

This patent is subject to a terminal disclaimer.

(21) Appl. No.: 13/439,203

(22) Filed: Apr. 4, 2012

(65) Prior Publication Data

US 2012/0317580 A1    Dec. 13, 2012

Related U.S. Application Data

(63) Continuation of application No. 13/157,478, filed on Jun. 10, 2011.

(51) Int. Cl.
*G06F 9/46* (2006.01)
*G06F 11/34* (2006.01)

(52) U.S. Cl.
CPC ........ *G06F 11/3409* (2013.01); *G06F 11/3476* (2013.01); *G06F 2201/865* (2013.01); *G06F 2201/87* (2013.01)
USPC .......................................... 718/101; 718/104

(58) Field of Classification Search
None
See application file for complete search history.

(56) References Cited

U.S. PATENT DOCUMENTS

| 7,028,301 | B2 | 4/2006 | Ding et al. |
| 2002/0116441 | A1* | 8/2002 | Ding et al. ................... 709/105 |
| 2008/0027962 | A1 | 1/2008 | Rong et al. |
| 2008/0097801 | A1 | 4/2008 | MacLellan et al. |
| 2009/0164270 | A1 | 6/2009 | Seidman |

* cited by examiner

*Primary Examiner* — Kenneth Tang
(74) *Attorney, Agent, or Firm* — Cantor Colburn LLP; William J. Stock

(57) ABSTRACT

A method for apportioning summarized metrics based on unsummarized metrics in a computing system includes receiving, by a memory device of the computing system, a log file, the log file comprising unsummarized metrics, the unsummarized metrics being related to a plurality of transactions performed by a program in the computing system, and a summarized metric, the summarized metric being related to the program, wherein the summarized metric comprises accumulated data from the plurality of transactions; selecting an unsummarized metric that reflects a distribution of the summarized metric among the plurality of transactions by a processing device of the computing system; and determining an amount of the summarized metric that belongs to a transaction of the plurality of transactions based on the selected unsummarized metric by the processing device of the computing system.

11 Claims, 4 Drawing Sheets

300

```
┌─────────────────────────────────────────────────────┐
│   RECEIVE PROGRAM AND TRANSACTION METRIC LOGS       │
│   INCLUDING SUMMARIZED PROGRAM-LEVEL METRICS AND    │
│   UNSUMMARIZED TRANSACTION-LEVEL METRICS FOR A SET  │
│   OF TRANSACTIONS AND AN INSTANCE OF A PROGRAM      │
│   THAT IS EXECUTED BY THE SET OF TRANSACTIONS       │
│                        301                          │
└─────────────────────────────────────────────────────┘
                          ⇩
┌─────────────────────────────────────────────────────┐
│   SELECT UNSUMMARIZED TRANSACTION-LEVEL METRIC FOR  │
│   APPORTIONING OF A SUMMARIZED PROGRAM-LEVEL METRIC │
│            FOR A PARTICULAR TRANSACTION             │
│                        302                          │
└─────────────────────────────────────────────────────┘
                          ⇩
┌─────────────────────────────────────────────────────┐
│   CALCULATE PORTION OF SUMMARIZED PROGRAM-LEVEL     │
│   METRIC BELONGING TO THE PARTICULAR TRANSACTION    │
│   BASED ON THE SELECTED UNSUMMARIZED                │
│   TRANSACTION-LEVEL METRIC                          │
│                        303                          │
└─────────────────────────────────────────────────────┘
```

FIG. 3

APPORTIONING SUMMARIZED METRICS BASED ON UNSUMMARIZED METRICS IN A COMPUTING SYSTEM

CROSS-REFERENCES TO RELATED APPLICATIONS

This application is a continuation of U.S. application Ser. No. 13/157,478 filed on Jun. 10, 2011.

BACKGROUND

This disclosure relates generally to the field of determination of resource usage in a computing system.

Determination of resource usage by various tasks executed in a computing system is critical for many aspects of processing, such as code refinement and billing. Computing systems typically produce log records containing information that can be used to determine various resource usage metrics for the different tasks executed by the computing system. For example, central processing unit (CPU) usage by a specific task may be determined by analyzing the log records. The log records may include data or metrics, describing various aspects of task resource usage in the computing system, and may correlate the data to specific tasks. The resource usage information contained in the log records may be either explicit (a metric provided by the producer of the record) or implicit (inferred from other information in the log records or by combining information from several log records).

A computing system may execute tasks by defining a set of transactions, each of which is associated with the execution of a program. The computing system may log performance metrics separately for transactions and programs. A transaction may include, for example, a request, which may be from a user at a remote terminal, for the computing system to perform a specific operation. When such a transaction is received by the computing system, and a program in the computing system is executed to handle the transaction. In another example, a transaction may include a batch job that executes a program in the computing system. An instance of a program may handle multiple transactions. While the computing system may produce log records for both program and transaction metrics, the log records may not preserve data at the transaction level. Instead, the transaction-related data may be summarized at the program level before being written to the log. Multiple transactions executing the same program will therefore have their usage metrics accumulated together and attributed to the single program.

Transaction-level metrics that are accumulated for all transactions executed by an instance of a program may be referred to as a summarized program-level metric. A summarized program-level metric may be apportioned among the transactions that executed the program by dividing the summarized program-level metric equally across all the transactions that executed the program. For example, the CPU usage for a transaction, t, that executes program P is approximated by $c_t = C_P/n$, where $c_t$ is the estimated CPU utilization for a transaction instance t, $C_P$ is total CPU utilization for the program P, and n is the number of transactions that executed program P. The CPU utilization for the transaction t is therefore an approximation based on transaction execution counts, and may not be an accurate reflection of the CPU utilization of the individual transaction t, as exactly the same CPU utilization is attributed to each transaction that executed program P.

BRIEF SUMMARY

In one aspect, a method for apportioning summarized metrics based on unsummarized metrics in a computing system includes receiving, by a memory device of the computing system, a log file, the log file comprising unsummarized metrics, the unsummarized metrics being related to a plurality of transactions performed by a program in the computing system, and a summarized metric, the summarized metric being related to the program, wherein the summarized metric comprises accumulated data from the plurality of transactions; selecting an unsummarized metric that reflects a distribution of the summarized metric among the plurality of transactions by a processing device of the computing system; and determining an amount of the summarized metric that belongs to a transaction of the plurality of transactions based on the selected unsummarized metric by the processing device of the computing system.

Additional features are realized through the techniques of the present exemplary embodiment. Other embodiments are described in detail herein and are considered a part of what is claimed. For a better understanding of the features of the exemplary embodiment, refer to the description and to the drawings.

BRIEF DESCRIPTION OF THE SEVERAL VIEWS OF THE DRAWINGS

Referring now to the drawings wherein like elements are numbered alike in the several FIGURES:

FIG. 3 illustrates a flowchart of an embodiment of a method for apportioning of summarized metrics based on unsummarized metrics.

DETAILED DESCRIPTION

Embodiments of systems and methods for apportioning of summarized metrics based on unsummarized metrics are provided, with exemplary embodiments being discussed below in detail. Summarized program-level metrics may be accurately apportioned among transactions that executed the program on the basis of unsummarized transaction-level metrics that are included in the logs. By selecting an unsummarized transaction-level metric that is a good reflection of the expected distribution of the summarized program-level metric of interest, a good approximation of the actual amount of the summarized program-level metric used by a particular transaction may be determined. Apportioning of metrics at the transaction level is thereby improved in accuracy, and transactions that invoke the same program are differentiated, as transactions will have a unique quantity of the metric apportioned to them that is directly associated with the individual transaction. The unsummarized program-level metric selected for apportioning the summarized metric may differ from transaction to transaction. For example, by analyzing the characteristics of a transaction it is possible to determine the unsummarized transaction-level metric which most closely represents the amount of the summarized metric that is attributable to the particular transaction.

Examples of unsummarized transaction-level metrics that may be used to apportion summarized metrics include numeric metrics such as elapsed time during transaction execution, number of database calls made by a transaction, number of input/output (I/O) operations by a transaction, and number of output messages or lines by a transaction. Alternatively, the unsummarized transaction-level metrics may not be numerical values in some embodiments; any kind of information about the transactions may be used, such as transaction type. The transaction type or other identifying information may also be correlated with historical numerical data associated with the various transaction types. The transaction type may refer to any characteristic or set of characteristics that can be defined for a transaction. For example, the transaction type might be the value of one or more flags or fields in the log record containing transaction information, or it might the set of all transactions performing less than some arbitrary number of I/Os. Examples of metrics that may be summarized in the logs at the program level include CPU usage, number of database calls, number of message queue calls, number of enqueues, number of dequeues, and/or number of waits on queues.

Figure 1:
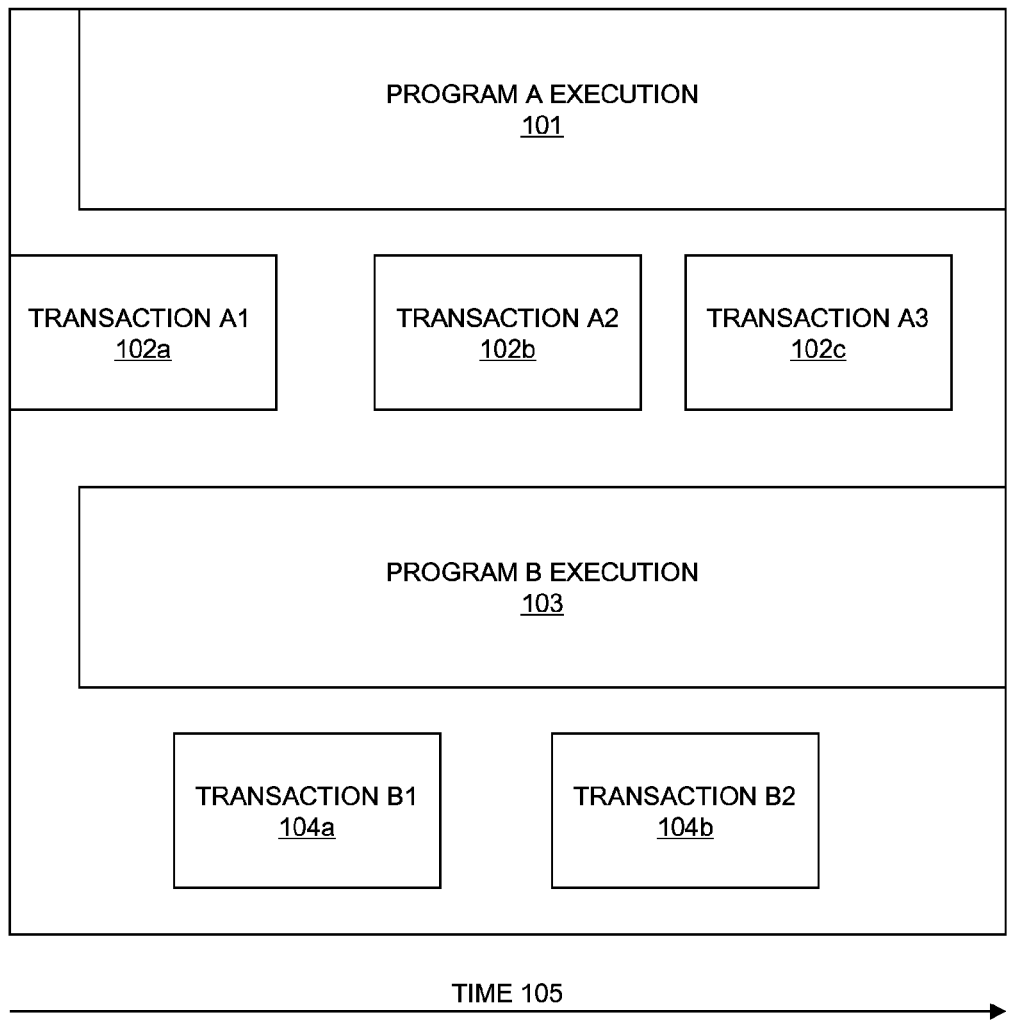
FIG. 1 illustrates execution of exemplary programs and related transactions over time.

FIG. 1 illustrates execution of two exemplary programs, program A (101) and program B (103), by associated respective transactions $A_1$-$A_3$ (102a-c) and $B_1$-$B_2$ (104a-b). The transactions $A_1$-$A_3$ (102a-c) and $B_1$-$B_2$ (104a-b) may represent requests from a user that execute their respective associated program, program A (101) or program B, on the computing system. The transactions $A_1$-$A_3$ (102a-c) and $B_1$-$B_2$ (104a-b) may originate from an operator of an external terminal in some embodiments. The horizontal axis 105 represents time. Program A (101) is first scheduled in response to transaction $A_1$ (102a) being requested. When transaction $A_1$ (102a) is completed, the program A (101) waits for more work, and thereafter proceeds to process two more transactions ($A_2$ and $A_3$, 102b-c). Then, program A (101) terminates. Termination may occur because program A (101), for example: has a defined limit of processing three transactions before it must be rescheduled or reloaded to run again; has a time limit to wait for more work which has been reached; or was terminated by an operator action. Termination may also occur because the computing system executing program A (101) was shut down. Meanwhile, program B (103) is scheduled in anticipation of work. The scheduling of program B (103) may be performed automatically by the computing system, or as the result of a system operator action. Program B (103) first processes transaction $B_1$ (104a) and then transaction $B_2$ (104b), and then program B terminates. Termination of program B (103) may be for any of the reasons described for program A (101). A single program may be executed by transactions having different types; transactions $A_1$-$A_3$ (102a-c) may therefore have different respective transaction types, and $B_1$-$B_2$ (104a-b) may also have different respective transaction types.

During execution of programs A (101) and B (103), program-level metrics indicating resource usage information are written in logs for programs A and B, and transaction-level metrics are written in logs for the transaction instances $A_1$-$A_3$ and $B_1$-$B_2$. The program-level metrics are summarized, giving information that is accumulated from all of the associated transactions that ran the particular program, whereas the transaction-level metrics are unsummarized, and give information particular to the individual transactions.

Figure 2:
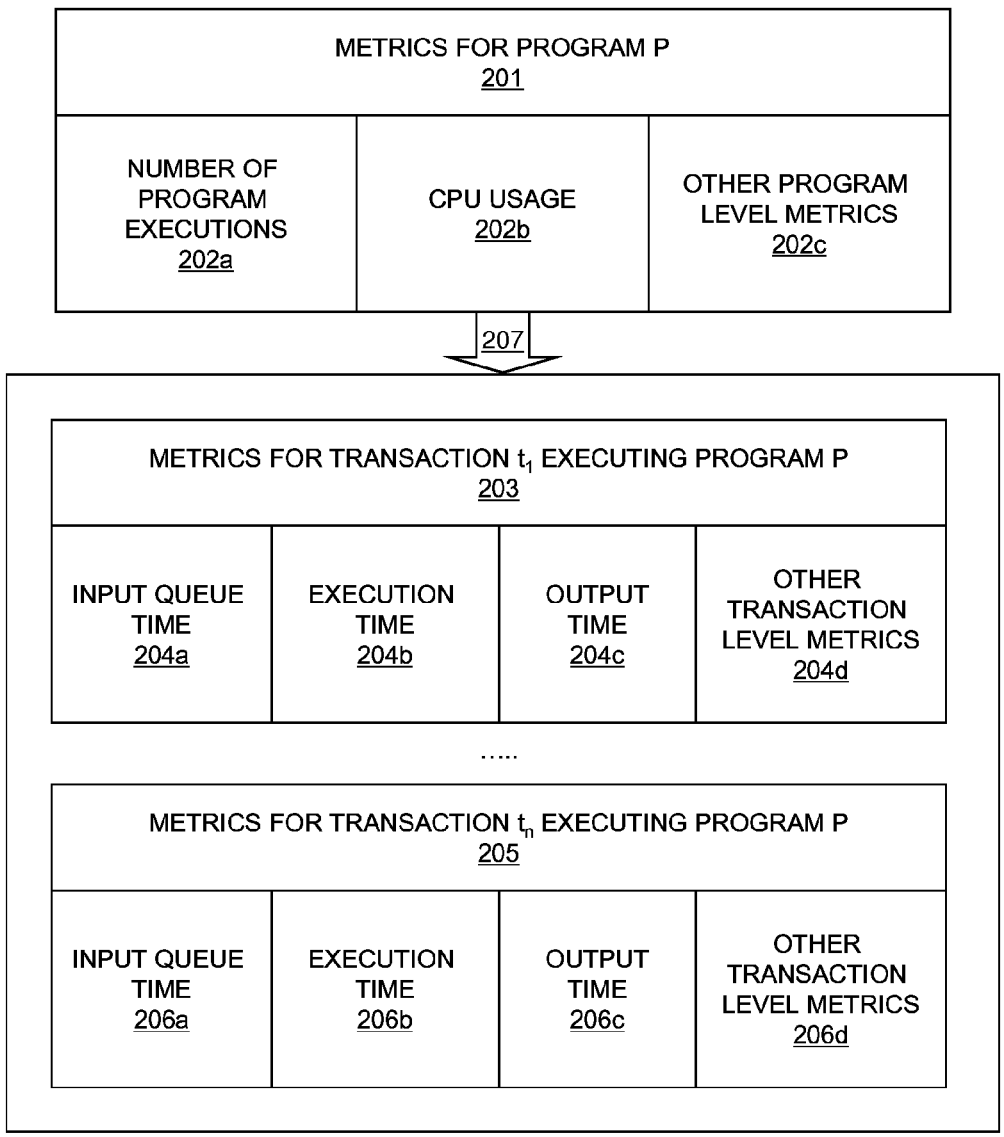
FIG. 2 illustrates an embodiment of program-level and transaction-level metric logs.

FIG. 2 illustrates an embodiment of a metric log 200 for a program instance and associated transactions, including summarized program-level metrics and unsummarized transaction-level metrics. Table 201 includes metrics for an instance of a program P. Field 202a is the number of executions of program P (i.e., the number n of transactions that have executed the instance of program P), field 202b is the total CPU usage for program P, and field(s) 202c may include any other program-level metrics. The CPU usage for transactions $t_1$ to $t_n$ that executed the instance of program P is accumulated into a single summarized program-level metric and written into the log 200 in field 202b. Arrow 207 indicates tables holding unsummarized metrics for transactions $t_1$ to $t_n$. Table 203 includes metrics for a transaction $t_1$ that executed program P, and includes input queue time field 204a, execution time field 204b, output time field 204c, and other transaction-level metrics in field(s) 204d. Table 205 includes metrics for a transaction $t_n$ that also executed program P, and includes input queue time field 206a, execution time field 206b, output time field 206c, and other transaction level metrics in field(s) 206d. Additional tables (not shown) holding unsummarized metrics for transactions $t_2$ to $t_{n-1}$ are also included in log 200; the number of transactions n associated with a program may be any appropriate number.

The log 200 of FIG. 2 is shown for illustrative purposes only; a log may contain any appropriate summarized and unsummarized metrics. In a first example, referring back to FIG. 1, for program A (101) and associated transactions $A_1$-$A_3$ (102a-c), table 201 would includes metrics from program A (101), and the number of program executions in field 202a would be 3. Table 203 would include metrics from transaction $A_1$ (102a), table 205 would include metrics from transaction $A_3$ (102c), and an additional table (not shown) would include metrics from transaction $A_2$ (102b). In this example, field 202b contains the total CPU usage attributable to all of transactions $A_1$-$A_3$ (102a-c). In a second example, for program B (103) and associated transactions $B_1$-$B_2$ (104a-b), table 201 would include metrics from program B (103), and the number of program executions in field 202a would be 2. Table 203 would include metrics from transaction $B_1$ (104a), and table 205 would include metrics from transaction $B_2$ (104b). In this example, field 202b contains the total CPU usage attributable to all of transactions $B_1$-$B_2$ (104a-b). Logs including summarized and unsummarized metrics such as those shown in FIG. 2 may be produced by an information management system (IMS) in some embodiments, or by any other appropriate type of computing system in other embodiments.

The unsummarized metrics, such as are included in tables 203 and 205 of FIG. 2, that relate to the behavior of the individual transactions may be used to determine ratios that can be used to calculate an approximation of the amount of a summarized program-level metric belonging to a particular transaction. For example, logical combinations of the various elapsed time metrics relating to transactions may be used to apportion CPU usage, including the time that an incoming message was passed to the program, the time that an outgoing message was placed on the message queue by the program, the time that the program started, and the time that the program ended. Other unsummarized transaction-level metrics that may be used include numeric metrics such as a number of database calls, number of I/O operations, and number of output messages or lines, or non-numeric metrics such as the type of transaction. For non-numeric metrics, historical numeric data relating to various transaction types may be used to determine ratios to apportion the summarized metrics. Historical numeric data may also be used in relation to numeric unsummarized metrics (discussed below in detail with respect to FIG. 3).

FIG. 3 illustrates a flowchart of an embodiment of a method 300 for apportioning of summarized program-level metrics based on unsummarized transaction level metrics. In block 301, transactions that request a single instance of a program are executed until the program terminates, and metrics reflecting the execution are written into logs at the program and transaction level. The metrics include summarized program-level metrics for all transactions that executed the program, and unsummarized transaction-level metrics for each individual transaction. Then, in block 302, an unsummarized transaction-level metric is selected to use for determining a particular transaction's share of a summarized program-level metric. The transaction-level metric that is selected is a good reflection of the expected distribution of the summarized program-level metric being apportioned. The selection of the transaction-level metric in block 302 may be based on historical data regarding the relationship between various transaction-level metrics and the program-level metric being apportioned in some embodiments, or may be based on, for example, the transaction type. Then, in block 303, the particular transaction's share of the summarized program-level metric is calculated based on a ratio that is determined using the selected unsummarized transaction-level metric.

Historical data, such as may be used for selecting the transaction-level metric in block 302, or for calculating the particular transaction's share of the summarized program-level metric in block 303, may be received from a monitor program in the computing system. Historical data may be analyzed and applied in various ways. For example, suppose the I/O counts for a transaction range from 1 to 100. The historical data might show that transactions with I/O counts between 40 and 60 typically have double the CPU use of other instances of this transaction. This correlation may be used to determine that I/O counts should be used as an unsummarized metric to apportion CPU usage (the summarized metric) for transactions with I/O counts in a certain range, or that the ratio determined in block 303 may need to be weighted for transactions with I/O counts in a certain range. In another example, the processing time of a transaction (i.e., the wall clock elapsed time during which a transaction is running, though not necessarily using the CPU) may be determined to have a high correlation with the transaction's CPU usage based on the historical data. For some computing systems, the historical data might show that one metric should always be selected in block 302 for transactions of one type, and another metric always should be selected for transactions of another type. For other computing systems, a dynamic metric selection method might look at several metrics or other characteristics of the transaction to reach a decision in block 302. Historical data may be received from a monitor that collects data from the computing system having greater detail than the data in the log records in some embodiments; the monitor may, however, be a relatively resource-intensive application and therefore not collect such detailed historical data at all times.

To illustrate application of method 300, a program P is executed n times by transactions labeled $t_1$ to $t_n$ in block 301, and unsummarized transaction-level metrics $m_1$ to $m_n$ and a summarized program-level metric $C_P$ for program P are written into the logs. In block 302, the metric m is selected as the unsummarized transaction-level metric to use to apportion the summarized program-level metric $C_P$ for transaction $t_1$. Therefore, in block 303, the apportionment calculation for $t_1$ is $m_1 * C_P / S$, where $m_1$ is the value of the transaction metric m for $t_1$, and S is the summation of the selected metric $m_1$ to $m_n$ for all transactions $t_1$ to $t_n$ that executed program P.

The unsummarized transaction-level metrics $m_1$ to $m_n$ may be respective execution times for transactions $t_1$ to $t_n$, which may be calculated from beginning and ending time stamps in the log in some embodiments, and $C_P$ may be the total CPU usage of program P in some embodiments. In other embodiments, $C_P$ may be a number of database calls, number of message queue calls, number of enqueues, number of dequeues, and/or number of waits on queues. For an embodiment of a program that executes in an information management system (IMS), $C_P$ may be a number of DL/I (an IMS database interface language) calls. In some embodiments, unsummarized transaction-level metrics $m_1$ to $m_n$ may be numeric metrics such as a number of database calls, number of I/O operations, and number of output messages or lines, or non-numeric metrics such as the type of transaction. For non-numeric metrics, historical numeric data relating to various transaction types may be used to determine ratios to apportion the summarized metrics. For example, if transaction type is selected in block 302 as metric m, then in block 303, $m_1 * C_P / S$ may be calculated based on historical numeric data associated with the transaction type, such as a typical execution time for the transaction type. The numeric value associated with the type of transaction $t_1$ is used for $m_1$, and S is the sum of the respective numeric values associated with each of the types of the transactions $t_1$ to $t_n$.

Determining of resource usage for individual transactions allows for accurate resource and performance accounting in the computing system. More accurate performance statistics allow isolation of poorly performing transactions and improved data center efficiencies such as reduced resource usage, with resulting energy savings. Resource costs associated with transactions can be appropriately apportioned, using monitoring and performance tools that produce an accurate picture of individual transaction performance.

Figure 4:
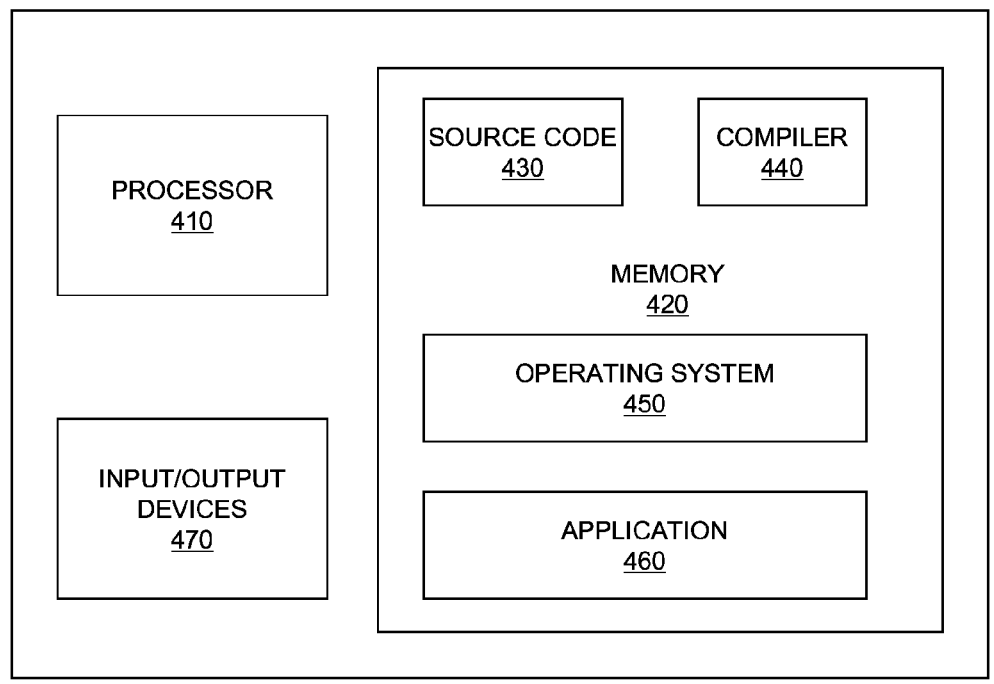
FIG. 4 is a schematic block diagram illustrating an embodiment of a computer that may be used in conjunction with embodiments of a method for apportioning of summarized metrics based on unsummarized metrics.

FIG. 4 illustrates an example of a computer 400 which may be utilized by exemplary embodiments of a method for apportioning of summarized program-level metrics using unsummarized transaction level metrics as embodied in software. Various operations discussed above may utilize the capabilities of the computer 400. One or more of the capabilities of the computer 400 may be incorporated in any element, module, application, and/or component discussed herein.

The computer 400 includes, but is not limited to, PCs, workstations, laptops, PDAs, palm devices, servers, storages, and the like. Generally, in terms of hardware architecture, the computer 400 may include one or more processors 410, memory 420, and one or more input and/or output (I/O) devices 470 that are communicatively coupled via a local interface (not shown). The local interface can be, for example but not limited to, one or more buses or other wired or wireless connections, as is known in the art. The local interface may have additional elements, such as controllers, buffers (caches), drivers, repeaters, and receivers, to enable communications. Further, the local interface may include address, control, and/or data connections to enable appropriate communications among the aforementioned components.

The processor 410 is a hardware device for executing software that can be stored in the memory 420. The processor 410 can be virtually any custom made or commercially available processor, a central processing unit (CPU), a digital signal processor (DSP), or an auxiliary processor among several processors associated with the computer 400, and the processor 410 may be a semiconductor based microprocessor (in the form of a microchip) or a macroprocessor.

The memory 420 can include any one or combination of volatile memory elements (e.g., random access memory (RAM), such as dynamic random access memory (DRAM), static random access memory (SRAM), etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 420 may incorporate electronic, magnetic, optical, and/or other types of storage media. Note that the memory 420 can have a distributed architecture, where various components are situated remote from one another, but can be accessed by the processor 410.

The software in the memory 420 may include one or more separate programs, each of which comprises an ordered listing of executable instructions for implementing logical functions. The software in the memory 420 includes a suitable operating system (O/S) 450, compiler 440, source code 430, and one or more applications 460 in accordance with exemplary embodiments. As illustrated, the application 460 comprises numerous functional components for implementing the features and operations of the exemplary embodiments. The application 460 of the computer 400 may represent various applications, computational units, logic, functional units, processes, operations, virtual entities, and/or modules in accordance with exemplary embodiments, but the application 460 is not meant to be a limitation.

The operating system 450 controls the execution of other computer programs, and provides scheduling, input-output control, file and data management, memory management, and communication control and related services. It is contemplated by the inventors that the application 460 for implementing exemplary embodiments may be applicable on all commercially available operating systems.

Application 460 may be a source program, executable program (object code), script, or any other entity comprising a set of instructions to be performed. When a source program, then the program is usually translated via a compiler (such as the compiler 440), assembler, interpreter, or the like, which may or may not be included within the memory 420, so as to operate properly in connection with the O/S 450. Furthermore, the application 460 can be written as an object oriented programming language, which has classes of data and methods, or a procedure programming language, which has routines, subroutines, and/or functions, for example but not limited to, C, C++, C#, Pascal, BASIC, API calls, HTML, XHTML, XML, ASP scripts, FORTRAN, COBOL, Perl, Java, ADA, .NET, and the like.

The I/O devices 470 may include input devices such as, for example but not limited to, a mouse, keyboard, scanner, microphone, camera, etc. Furthermore, the I/O devices 470 may also include output devices, for example but not limited to a printer, display, etc. Finally, the I/O devices 470 may further include devices that communicate both inputs and outputs, for instance but not limited to, a NIC or modulator/demodulator (for accessing remote devices, other files, devices, systems, or a network), a radio frequency (RF) or other transceiver, a telephonic interface, a bridge, a router, etc. The I/O devices 470 also include components for communicating over various networks, such as the Internet or intranet.

If the computer 400 is a PC, workstation, intelligent device or the like, the software in the memory 420 may further include a basic input output system (BIOS) (omitted for simplicity). The BIOS is a set of essential software routines that initialize and test hardware at startup, start the O/S 450, and support the transfer of data among the hardware devices. The BIOS is stored in some type of read-only-memory, such as ROM, PROM, EPROM, EEPROM or the like, so that the BIOS can be executed when the computer 400 is activated.

When the computer 400 is in operation, the processor 410 is configured to execute software stored within the memory 420, to communicate data to and from the memory 420, and to generally control operations of the computer 400 pursuant to the software. The application 460 and the O/S 450 are read, in whole or in part, by the processor 410, perhaps buffered within the processor 410, and then executed.

When the application 460 is implemented in software it should be noted that the application 460 can be stored on virtually any computer readable medium for use by or in connection with any computer related system or method. In the context of this document, a computer readable medium may be an electronic, magnetic, optical, or other physical device or means that can contain or store a computer program for use by or in connection with a computer related system or method.

The application 460 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium.

More specific examples (a nonexhaustive list) of the computer-readable medium may include the following: an electrical connection (electronic) having one or more wires, a portable computer diskette (magnetic or optical), a random access memory (RAM) (electronic), a read-only memory (ROM) (electronic), an erasable programmable read-only memory (EPROM, EEPROM, or Flash memory) (electronic), an optical fiber (optical), and a portable compact disc memory (CDROM, CD R/W) (optical). Note that the computer-readable medium could even be paper or another suitable medium, upon which the program is printed or punched, as the program can be electronically captured, via for instance optical scanning of the paper or other medium, then compiled, interpreted or otherwise processed in a suitable manner if necessary, and then stored in a computer memory.

In exemplary embodiments, where the application 460 is implemented in hardware, the application 460 can be implemented with any one or a combination of the following technologies, which are well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

The technical effects and benefits of exemplary embodiments include accurate determination of resource usage by transactions in a computing system that logs both summarized metrics and unsummarized metrics.

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. A method for apportioning summarized metrics based on unsummarized metrics in a computing system, the method comprising:

receiving, by a memory device of the computing system, a log file, the log file comprising a plurality of unsummarized metrics comprising a plurality of metrics corresponding to individual transactions of a plurality of transactions, wherein each of the plurality of transactions executed a program in the computing system, and a summarized metric, the summarized metric being related to the program that was executed by each of the plurality of transactions, wherein the summarized metric comprises accumulated data across all of the plurality of transactions during execution of the program, wherein the unsummarized metrics in the log file comprise a number of database calls made by each of the plurality of transactions, a number of input/output (I/O) operations performed by each of the plurality of transactions, a number of output messages or lines by each of the plurality of transactions, beginning and ending time stamp information for each of the plurality of transactions, and a transaction type of each of the plurality of transactions;

selecting an unsummarized metric of the plurality of unsummarized metrics that reflects a distribution of the summarized metric among the plurality of transactions;

summing the selected unsummarized metric for each of the plurality of transactions;

determining a ratio of the selected unsummarized metric for a given transaction of the plurality of transactions to the sum of the selected unsummarized metric for each of the plurality of transactions; and multiplying the ratio by the summarized metric to determine an amount of the summarized metric that belongs to the given transaction based on the selected unsummarized metric.

2. The method of claim 1, wherein the computing system comprises an information management system (IMS).

3. The method of claim 1, further comprising weighting the determined ratio based on based on historical numeric data collected by a monitor of the computing system.

4. The method of claim 1, wherein the summarized metric comprises central processing unit (CPU) usage by all of the plurality of transactions.

5. The method of claim 1, wherein the selected unsummarized metric comprises the number of database calls made by each of the plurality of transactions.

6. The method of claim 1, wherein the selected unsummarized metric comprises the number of input/output (I/O) operations by each of the plurality of transactions.

7. The method of claim 1, wherein the selected unsummarized metric comprises the number of output messages or lines by each of the plurality of transactions.

8. The method of claim 1, wherein the selected unsummarized metric comprises beginning and ending time stamp information for each of the plurality of transactions.

9. The method of claim 1, wherein the selected unsummarized metric comprises the transaction type of each of the plurality of transactions.

10. The method of claim 9, wherein historical numeric data related to the transaction type is used to determine the amount of the summarized metric that belongs to the transaction of the plurality of transactions based on the selected unsummarized metric.

11. The method of claim 1, wherein selecting the unsummarized metric of the plurality of unsummarized metrics that reflects the distribution of the summarized metric among the plurality of transactions is performed based on historical numeric data collected by a monitor of the computing system.

* * * * *